June 23, 1942.    P. NEDAL    2,287,263
APPARATUS FOR ASSEMBLING SLIDE FASTENER STRINGERS
Original Filed May 26, 1936    3 Sheets-Sheet 1
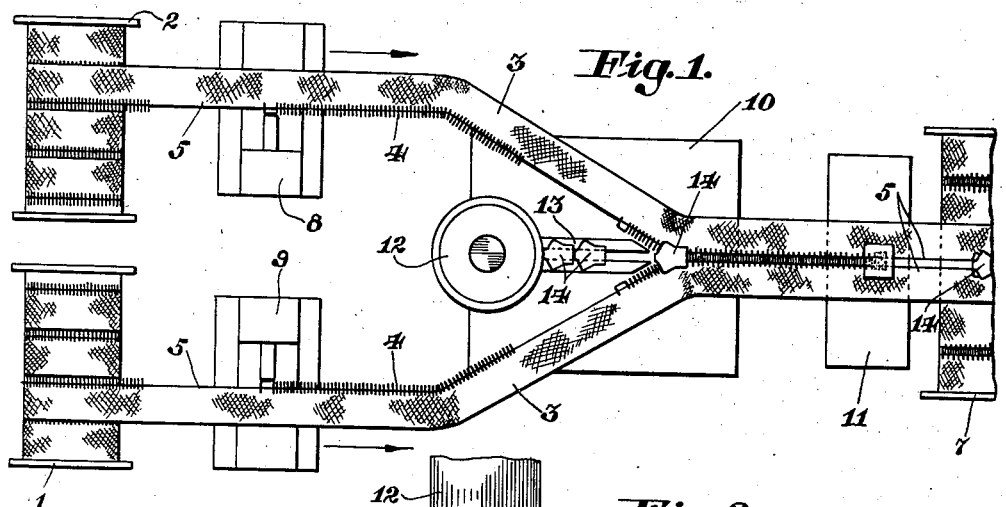
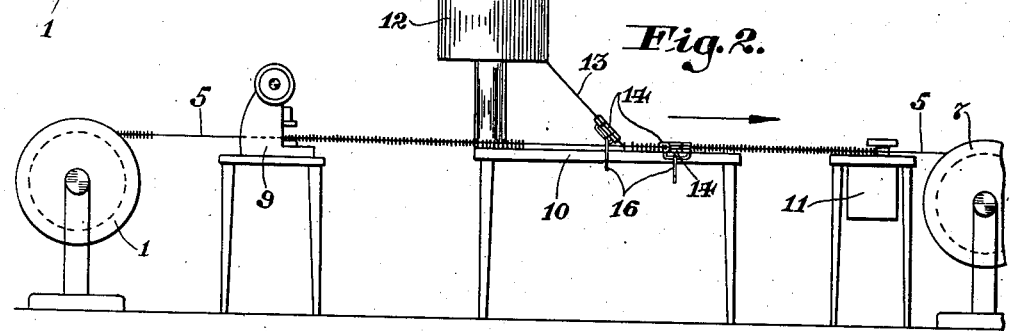
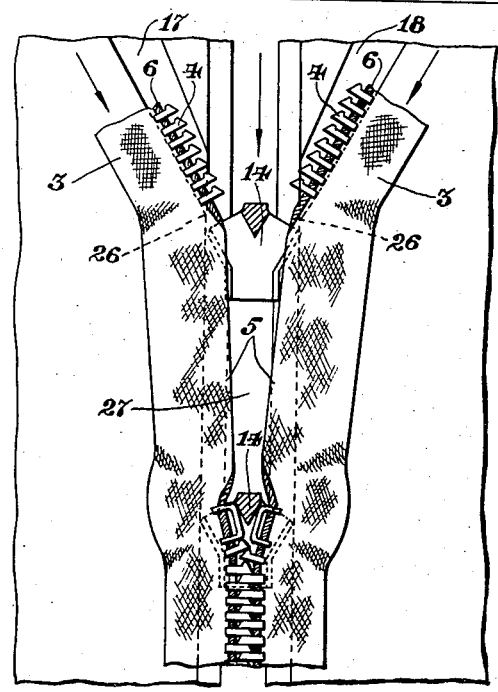
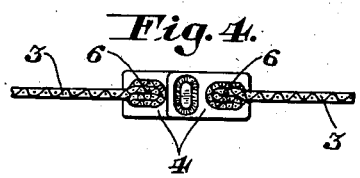
INVENTOR.
*Peder Nedal.*
BY *R. S. Kelly.*
ATTORNEY.

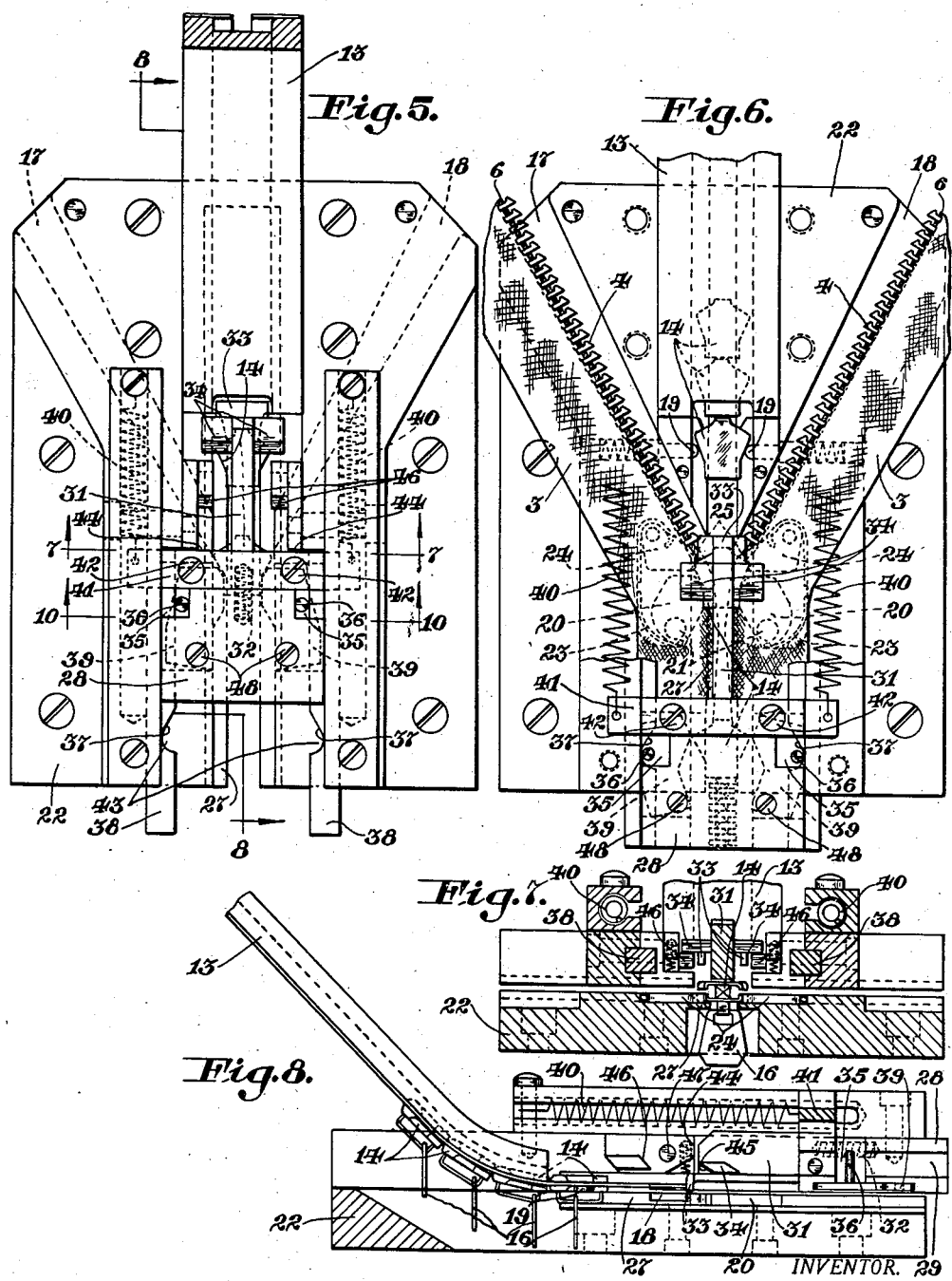

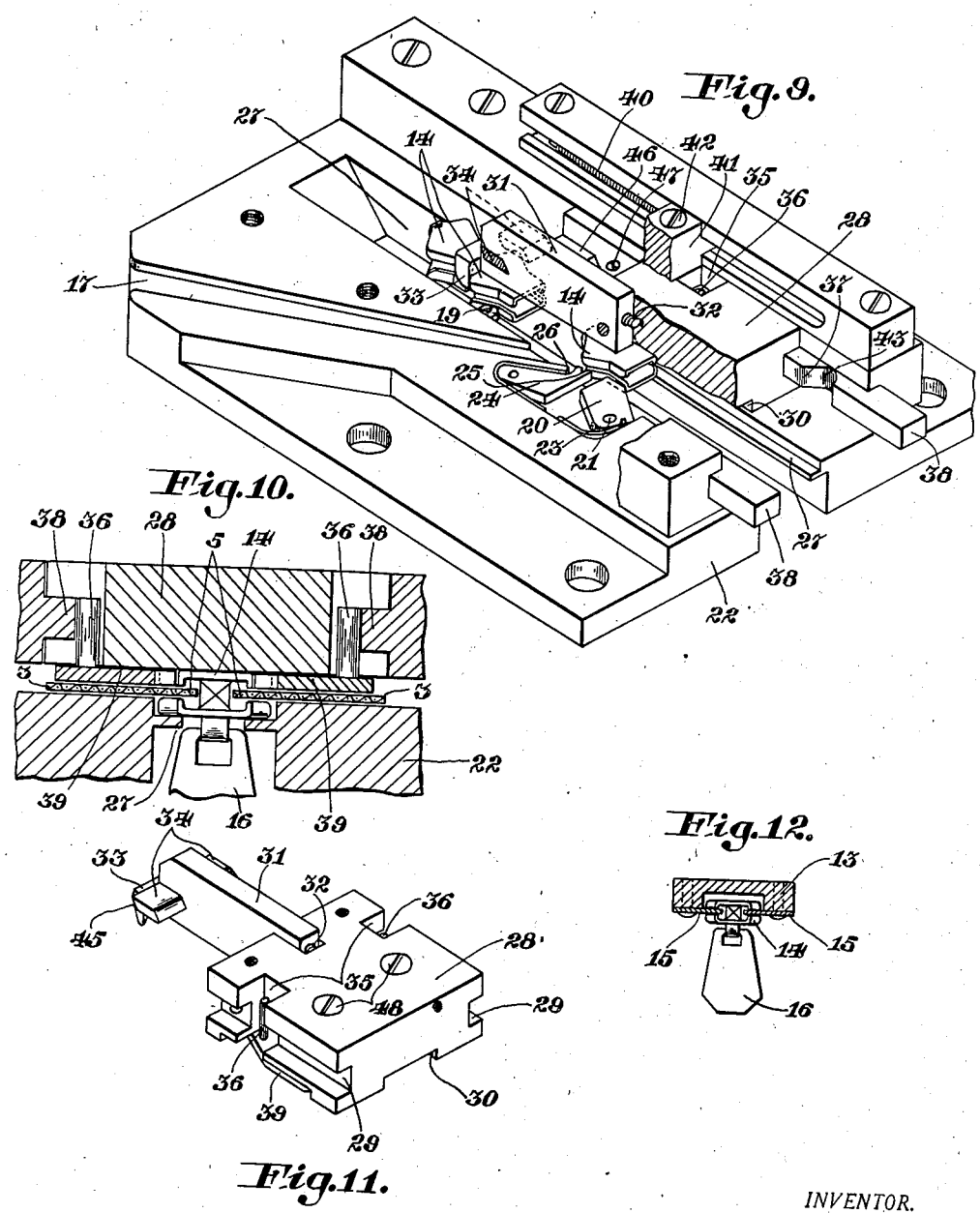

Patented June 23, 1942

2,287,263

UNITED STATES PATENT OFFICE 2,287,263

APPARATUS FOR ASSEMBLING SLIDE FASTENER STRINGERS

Peder Nedal, Meadville, Pa., assignor to Talon, Inc., a corporation of Pennsylvania Original application May 26, 1936, Serial No. 81,811. Divided and this application June 24, 1940, Serial No. 342,143

5 Claims. (Cl. 29—84)

My invention relates to slide fastener manufacture and particularly to apparatus for assembling parts of slide fasteners while in a continuous strip. This application is a division of my copending application Serial No. 81,811 filed May 26, 1936, which matured into Letters Patent No. 2,219,165 granted October 22, 1940.

An object of my invention is to provide an improved apparatus for making slide fasteners in which the parts of the fastener are more conveniently transferred and handled during the various assembling operations. Heretofore, slide fasteners have been made by taking continuous fastener stringers each having uniformly arranged groups of closely spaced elements, connecting the two continuous stringers together by the individual groups of fastener elements, cutting the two connected continuous stringers or chains between the interconnected groups into fastener lengths, and later assembling a slider and suitable stop members on each group. In the prior method each single fastener length must be handled separately in the various bottom stop, slider, and top stop assembling operations.

My improved apparatus not only eliminates the individual handling of single fastener lengths but it also provides for the automatic handling of the fastener parts such as the stop members and the sliders. My invention embodies improved apparatus for delivering and positioning in turn a series of sliders relative to the fastener stringers and for properly assembling them at the appropriate intervals on the stringers.

Other objects and advantages of my invention will more fully appear during the course of the following specification and appended claims.

In the accompanying drawings:

Fig. 1 is a schematic view illustrating various steps in my improved method of making slide fasteners involving the use of the apparatus of this present invention;

Fig. 2 is an elevation view showing schematically the same apparatus as shown in Fig. 1;

Fig. 3 is a detail view illustrating the automatic assembly of the sliders and fastener stringers;

Fig. 4 is a cross-section of the assembled fastener stringers;

Fig. 5 is a plan view of the slider assembly mechanism;

Fig. 6 is a horizontal sectional view of the slider assembly mechanism;

Fig. 7 is a sectional view on line 7—7 of Fig. 5;

Fig. 8 is a vertical longitudinal section on line 8—8 of Fig. 5;

Fig. 9 is a perspective view to facilitate illustration of portions of the slider assembly mechanism;

Fig. 10 is a detail cross-section on line 10—10 of Fig. 5;

Fig. 11 is a perspective view of the automatic slider feeder; and

Fig. 12 is a detail sectional view of the slider chute.

In manufacturing slide fasteners in accordance with my improved method it will be understood that the continuous fastener stringer has been made up upon chain machines or in any suitable manner, and such continuous stringer is preferably wound on spools 1 and 2. A stringer of the type in question comprises a continuous fabric tape 3 carrying groups of fastener elements 4, the elements in a group being closely spaced apart and the length of a group varying in accordance with the desired length of fastener. This ordinarily ranges from three inches to thirty-six inches. Between the groups of elements are gap spaces or blank spaces 5, which are usually at least one inch in width and may be as long as three inches, depending on the desired amount of tape extension in the finished fastener.

As shown in Fig. 4 the edge of the tape to which the fastener elements are applied is a beaded edge preferably formed by folding the edge of a flat tape backwardly on itself and then reversely and around the edge of the tape again. The beaded edge is designated by the numeral 6. At the portions of the tape to which the fastener elements are clamped the beaded edge is held firmly pressed together but at the blank portions it is more or less free to unfold to a flat condition as illustrated in Fig. 3.

In my improved method the top stops are applied one to each stringer, the slider is assembled with a pair of stringers during which operation the fastener elements are interlocked, the bottom stops are applied, all while the stringers are integrally attached to one another as a single continuous length. The assembled connected fasteners may then be wound on a spool 7 or, if desired, a cut-off machine may be provided for cutting the stringer apart into individual fastener lengths.

The top stop devices herein indicated at 8 and 9 may be of any conventional form and they will not be described herein. Devices of this type are well known in the art, and have been used for many years. They may be hand operated, partially automatic, fully automatic, as desired.

The stringers next pass to an assembling machine generally designated by the numeral 10, where they are assembled together with each other and with a slider. They next pass through a bottom stop machine 11, which may also be of any known type, for example, the bottom stop machine disclosed in the application of Frank G. Osgood, Serial No. 747,081, Patent 2,096,685, or a suitable stapling machine which inserts a staple through the tapes adjacent the connected end of the fastener.

In feeding the sliders to the automatic assembling machine, a suitable form of hopper, schematically shown at 12, may be employed for arranging the fastener elements and feeding them to an inclined chute 13. Such a hopper is disclosed in the patent to Lockie No. 1,973,720. A cross-section of this chute is found in Fig. 12. The sliders 14 ride on the guide plates 15, which project inwardly through the lateral slots of the slider. The pull tabs 16 of the slider preferably hang downwardly.

Referring now to Figs. 5 to 11 inclusive, the stringers pass through converging guideways 17, 18 in the form of suitable channels having a depth suitable for the free passage of the fastener elements. The tape 3 extends laterally through a slot in each of these guides. The sliders in their passage down the chute come against the spring held stop pins 19 from which position the endmost slider is positively actuated against the resistance of the spring plungers by means which will be later described, to an assembled position where it rests against the positioning dogs 20 pivoted at 21 to the bed 22 of the machine. These dogs are only of sufficient thickness to engage the lower wing of the slider as shown in the cross-sectional view, Fig. 7. They are normally spring-pressed by the leaf spring 23 inwardly so as yieldingly to grip the slider but their inclined slider engaging surfaces will permit the slider to pass when a sufficient pulling force is applied to the slider. The slider is prevented from accidentally moving backward by the spring actuated holding dogs 24. These dogs have notches 25 which engage over the outer corner of the slider in holding position, but are so shaped that they will allow the sliders to pass freely in one direction. The fastener stringer guideways control the path of the fastener elements up to the points indicated in Fig. 3, by the numeral 26, from which point they pass directly into the channel of a slider which is held between the dogs 20 and 24.

The stringers are pulled from the exit end of the machine by suitable means such as a continuous winding drum or by hand and the operator will watch the stringers as the fastener elements approach a slider and see that they are properly aligned, otherwise a slight adjustment will need to be made of one stringer relative to the other. Assuming that the elements on the opposite stringer are properly aligned, they will be pulled into the slider and interlocked and the slider will remain stationary until the top stops come together inside the slider. Now a sufficient pull on the stringers will release the slider from the holding dogs 20 and allow it to move outwardly from the machine with the assembled stringers. During this movement through the machine as shown in Fig. 7, the slider is supported in suitable guideways 27 with the pull tab hanging downwardly through a slot in the guideway.

The action of the slider actuator will be best understood after a brief description of its construction. In Fig. 11 it is shown in perspective.

It comprises generally a block 28 with guide grooves 29 on opposite sides. It also is grooved on the bottom at 30 to allow passage of the slider. The actuating bar 31 is pivoted for limited vertical movement to the block 28 at one end and is normally held in its downward position by a coil spring 32. The actuating bar carries suitable hooks 33 at its end for engaging over the wide end of the slider, and it also carries adjacent the hook 33, cam members 34. The block 28 has notches 35 at its sides in which the vertical pins 36 may move inwardly and outwardly under the control of suitable cams 37 on the guide rails 38, which fit into the guide grooves 29 of the block 28. As better seen in Fig. 6, the guide pins are carried by the latch members 39 which can oscillate about the pins 48. These latch members are shaped at their forward ends to engage the inclined side edges of the upper wing of the slider. When the latch members are held inwardly by reason of the engagement of the pins 36 against the guide rails 38, the slider will bear against the ends of the latch members and if a pull is placed on the stringers it will carry the latch members and in turn, the slide block 28 along with it against the tension of coil springs 40, which are connected to the slide block through the cross-arm 41, secured in turn to the block by screws 42. The slide block will thus be carried along until the pins 36 pass into the notches 43 in the guide rails. This will allow the latch members to yield sidewise until the slider can pass freely between them. Immediately at that time the springs 40 return the slide block until it strikes against the stop shoulders 44. During this return movement the actuating bar is lifted upwardly by the inclined cam surfaces 45 on the cam member 34 which ride over the forward inclined surface of the cooperating cam member 46. This cam member is pivoted at 47 and is normally spring-held in the position shown in Fig. 8. After the cam member 34 passes over the cam member 46 the actuating bar 31 will drop, whereupon the hooks 33 will engage behind the wide end of the slider which is held between the pins 19. Now when the slide block is again actuated by reason of the next fastener group, a slider moving out of the machine and pulling with it the slide block 28, the hooks 33 will pull the slider from the end of the chute into the assembling position. In this manner the cycle is repeated so long as fastener stringers are supplied and so long as they are pulled through the machine. During the forward movement of the slide block, the cam member 46 is automatically lifted upwardly so as to allow free passage of the actuating member 31.

It will be observed according to my invention, that all of the assembling operations in the manufacture of slide fasteners are performed while the fastener chain is in strip form and that after the completed fasteners are made they may be cut apart. This greatly facilitates the handling of fastener chain and their connected parts, during various operations, and this is particularly true when the operations are to be performed by automatic machinery. Also this reduced handling of the parts and process of manufacture greatly reduces the cost of the completed fastener. My improved method and apparatus opens the gateway to complete automatic production of slide fasteners.

While I have shown and described in this application one embodiment which my invention may assume in practice, it is understood that this embodiment is merely for the purpose of illustration and description and that various other forms may be devised within the scope of my invention as defined in the appended claims.

Having thus fully described my invention, what I claim as new and desire to secure by Letters Patent is:

1. Apparatus for assembling pairs of stringers of individual fasteners from continuous strips comprising rows of interlocking fastener members and intervening gap spaces forming a series of connected individual fastener stringers, which comprises a pair of guideways each receiving one of said strips, said guideways converging at a common point into a single guideway for connected pairs of interlocked stringers, means for holding a slider at the converging point of said channels in such position that the branches of the slider channel register with the guideways, said holding means being yieldable to release said slider when a substantial pull is exerted thereon by the fastener stringers, and means automatically feeding sliders in turn to said slider holding means.

2. Apparatus for assembling pairs of stringers of individual fasteners from continuous strips comprising rows of interlocking fastener members and intervening gap spaces forming a series of connected individual fastener stringers, which comprises a pair of guideways each receiving one of said strips, a guideway for a slider, said stringer guideways converging at a common point into said slider guideway to form a guideway for connected pairs of interlocked stringers, means for positioning a slider at the converging point of said stringer guideways in such position that the slider channels register with said guideways, said slider positioning means being yieldable to release said slider when a substantial pull is exerted thereon by fastener stringers passing through a slider held by said slider positioning means, and means automatically rendering said slider positioning means operative to hold a succeeding slider after each slider is released.

3. Apparatus for assembling pairs of stringers of individual fasteners from continuous strips comprising rows of interlocking fastener members and intervening gap spaces forming a series of connected individual fastener stringers, which comprises a pair of stringer guideways each receiving one of said strips, a guideway for a slider, said stringer guideways converging at a common point into said slider guideway, means for introducing a slider into said guideway, a slider positioning member positioning the slider for registration of the slider channels with said stringer guideways so that the stringers pass through the slider channels into interlocked relation, feed means movably carried by said slider positioning member having elements cooperating with sliders on successive pairs of interlocked stringers whereby said feed means is caused to be moved together with the slider through the guideway a predetermined distance, means on said feed means engaging and simultaneously moving the next slider into position during its predetermined distance of movement, and means to return said feed means after it has moved said predetermined distance.

4. In apparatus for assembling pairs of stringers of individual fasteners from continuous strips comprising rows of interlocking fastener members and intervening gap spaces forming a series of connected individual fastener stringers, means yieldingly holding a slider at a predetermined point, means for guiding a pair of said strips into said slider and means for pulling said strips through said slider, said slider holding means yielding to release a slider upon transmission to a held slider of sufficient force to overbalance said slider holding means.

5. Top stop actuated slider attaching means for assembling sliders to the individual stringers of a pair of continuous strips comprising rows of interlocking fastener members and intervening gap spaces forming a series of connected individual fastener stringers with a top stop at the upper end of each row of interlocking fastener members comprising means yieldingly holding sliders at a predetermined point, means for guiding a pair of said strips into and through said sliders, and means for pulling said strips through said sliders, said slider holding means yielding to release a slider upon transmission to a held slider of force sufficient to overbalance said slider holding means through engagement between top stops on stringers and sliders yieldingly held by said slider holding means.

PEDER NEDAL.